(12) United States Patent
Houck et al.

(10) Patent No.: US 11,852,531 B2
(45) Date of Patent: Dec. 26, 2023

(54) SENSOR DEVICE AND METHOD OF USE

(71) Applicant: VIAVI Solutions Inc., San Jose, CA (US)

(72) Inventors: William D. Houck, Santa Rosa, CA (US); Valton Smith, Novato, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 17/663,256

(22) Filed: May 13, 2022

(65) Prior Publication Data

US 2022/0268626 A1    Aug. 25, 2022

Related U.S. Application Data

(63) Continuation of application No. 17/247,789, filed on Dec. 23, 2020, now Pat. No. 11,340,111, which is a
(Continued)

(51) Int. Cl.
*G01J 3/28* (2006.01)
*G01J 3/02* (2006.01)
(Continued)

(52) U.S. Cl.
CPC ............. *G01J 3/027* (2013.01); *G01J 3/0229* (2013.01); *G01J 3/42* (2013.01); *G01S 17/08* (2013.01)

(58) Field of Classification Search
CPC . G01J 3/027; G01J 3/0229; G01J 3/42; G01S 17/08; G01S 7/4816; G01S 17/86; G01N 21/31
See application file for complete search history.

(56) References Cited

U.S. PATENT DOCUMENTS 7,817,282 B2 * 10/2010 Bowlan ................... G01J 11/00
356/477
9,234,618 B1    1/2016 Zhu et al.
(Continued)

FOREIGN PATENT DOCUMENTS

CN    107295236 A    10/2017
CN    108415030 A    8/2018
(Continued)

OTHER PUBLICATIONS

International Search Report and Written Opinion for Application No. PCT/US2020/017543, dated Jun. 9, 2020, 21 pages.

*Primary Examiner* — Abdullahi Nur
(74) *Attorney, Agent, or Firm* — Harrity & Harrity, LLP

(57) ABSTRACT

A device may determine a time-of-flight measurement by performing a sample of a sensor based on light received via at least one first spectral filter, wherein the at least one first spectral filter is associated with a spectral range for a time-of-flight measurement; determine that a condition is satisfied with regard to the time-of-flight measurement, wherein the condition relates to an orientation or a position of the sensor or the sensor device relative to a measurement target; trigger a spectrometry measurement to be performed based on determining that the condition is satisfied with regard to the time-of-flight measurement; and perform, based on light received via at least one second spectral filter and by performing a sample of the sensor, the spectrometry measurement for the measurement target based on the condition being satisfied with regard to the time-of-flight measurement.

20 Claims, 8 Drawing Sheets

Related U.S. Application Data continuation of application No. 16/784,766, filed on Feb. 7, 2020, now Pat. No. 10,876,889.

(60) Provisional application No. 62/804,609, filed on Feb. 12, 2019.

(51) Int. Cl.
*G01S 17/08* (2006.01)
*G01J 3/42* (2006.01)

(56) References Cited

U.S. PATENT DOCUMENTS

| | | | |
|---|---|---|---|
| 10,012,532 B2* | 7/2018 | Send | G06T 7/73 |
| 10,397,552 B2* | 8/2019 | Van Nieuwenhove | H04N 13/207 |
| 10,578,739 B2 | 3/2020 | Buettgen et al. | |
| 10,876,889 B2 | 12/2020 | Houck et al. | |
| 11,340,111 B2 | 5/2022 | Houck et al. | |
| 2004/0174522 A1* | 9/2004 | Hagler | G01J 3/02 356/310 |
| 2005/0151965 A1 | 7/2005 | Bissett, III et al. | |
| 2006/0203248 A1 | 9/2006 | Reichardt et al. | |
| 2013/0335725 A1 | 12/2013 | Hardegger et al. | |
| 2014/0078459 A1 | 3/2014 | Kim et al. | |
| 2016/0295193 A1 | 10/2016 | Van Nieuwenhove et al. | |
| 2017/0146401 A1* | 5/2017 | Antila | G01J 3/45 |
| 2018/0270474 A1 | 9/2018 | Liu | |
| 2019/0041329 A1* | 2/2019 | Hill | G02B 27/286 |
| 2019/0187347 A1* | 6/2019 | Bilger | G02B 5/281 |
| 2020/0096613 A1 | 3/2020 | Li et al. | |
| 2020/0116862 A1 | 4/2020 | Xu et al. | |
| 2020/0141920 A1* | 5/2020 | Glazier | H01J 49/0409 |

FOREIGN PATENT DOCUMENTS

| | | |
|---|---|---|
| TW | 201721085 A | 6/2017 |
| WO | 2016166651 A1 | 10/2016 |
| WO | 2017206522 A1 | 12/2017 |

* cited by examiner

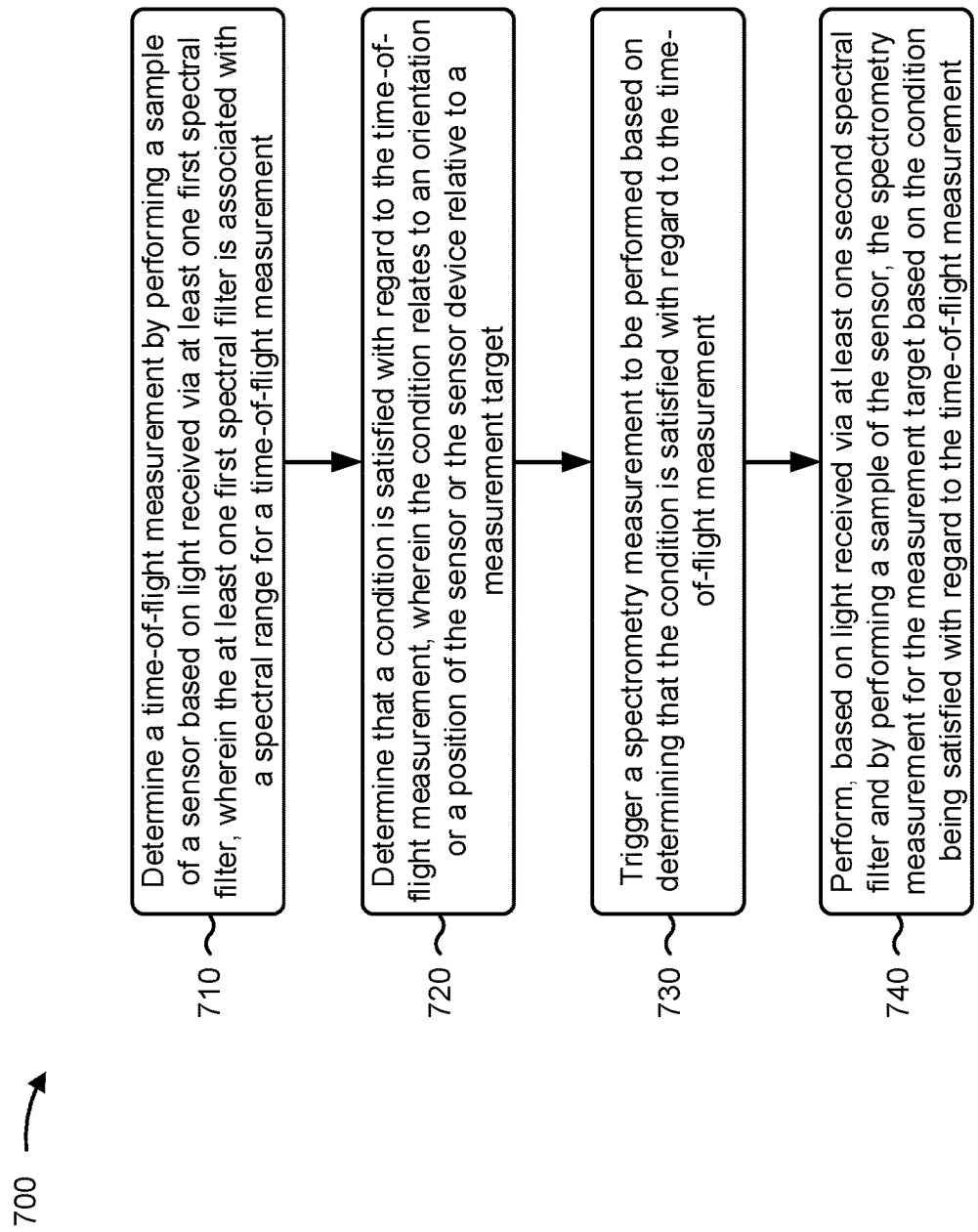

SENSOR DEVICE AND METHOD OF USE

RELATED APPLICATION(S)

This application is a continuation of U.S. patent application Ser. No. 17/247,789, filed Dec. 23, 2020 (now U.S. Pat. No. 11,340,111), which is a continuation of U.S. patent application Ser. No. 16/784,766, filed Feb. 7, 2020 (now U.S. Pat. No. 10,876,889), which claims priority to U.S. Provisional Patent Application No. 62/804,609, filed Feb. 12, 2019, the contents of which are incorporated herein by reference in their entireties.

BACKGROUND

A sensor device may be utilized to capture information for spectrometry analysis. For example, the sensor device may capture information relating to a set of electromagnetic frequencies. The sensor device may include a set of sensor elements (e.g., optical sensors, spectral sensors, and/or image sensors) that capture the information. For example, an array of sensor elements may be utilized to capture information relating to multiple frequencies. An analysis may be performed on the information relating to the multiple frequencies to determine spectrometry information.

SUMMARY

In some aspects, a device for wireless communication may include a sensor. The device may include at least one first spectral filter and at least one second spectral filter, wherein the at least one first spectral filter is associated with a spectral range for a time-of-flight measurement, and wherein the at least one second spectral filter is associated with a spectral range for a spectrometry measurement. The device may include one or more memories. The device may include one or more processors, communicatively coupled to the one or more memories, to: determine, using the sensor, the time-of-flight measurement based on light received via the at least one first spectral filter; determine that a condition is satisfied with regard to the time-of-flight measurement, wherein the condition relates to an orientation or a position of the sensor or the sensor device relative to a measurement target; trigger the spectrometry measurement to be performed based on determining that the condition is satisfied with regard to the time-of-flight measurement; perform, using the sensor and based on light received via the at least one second spectral filter, the spectrometry measurement for the measurement target based on the condition being satisfied with regard to the time-of-flight measurement; and provide information identifying the spectrometry measurement.

In some aspects, a method of wireless communication may include performing, by a sensor device and using a sensor, a time-of-flight measurement based on light received via at least one first spectral filter, wherein the at least one first spectral filter is associated with a spectral range for a time-of-flight measurement; determining, by the sensor device, that a condition is satisfied with regard to the time-of-flight measurement, wherein the condition relates to an orientation or a position of the sensor or the sensor device relative to a measurement target; performing, by the sensor device, using the sensor, and based on light received via at least one second spectral filter, a spectrometry measurement for the measurement target based on the condition being satisfied with regard to the time-of-flight measurement; and providing, by the sensor device, information identifying the spectrometry measurement.

In some aspects, a non-transitory computer-readable medium may store one or more instructions for wireless communication. The one or more instructions, when executed by one or more processors of a device, may cause the one or more processors to: determine a time-of-flight measurement by performing a sample of a sensor based on light received via at least one first spectral filter, wherein the at least one first spectral filter is associated with a spectral range for a time-of-flight measurement; determine that a condition is satisfied with regard to the time-of-flight measurement, wherein the condition relates to an orientation or a position of the sensor or the sensor device relative to a measurement target; trigger a spectrometry measurement to be performed based on determining that the condition is satisfied with regard to the time-of-flight measurement; and perform, based on light received via at least one second spectral filter and by performing a sample of the sensor, the spectrometry measurement for the measurement target based on the condition being satisfied with regard to the time-of-flight measurement.

BRIEF DESCRIPTION OF THE DRAWINGS

FIG. 7 is a flow chart of an example process for performing a spectrometry measurement based on a time-of-flight measurement.

DETAILED DESCRIPTION

Figure 1A:
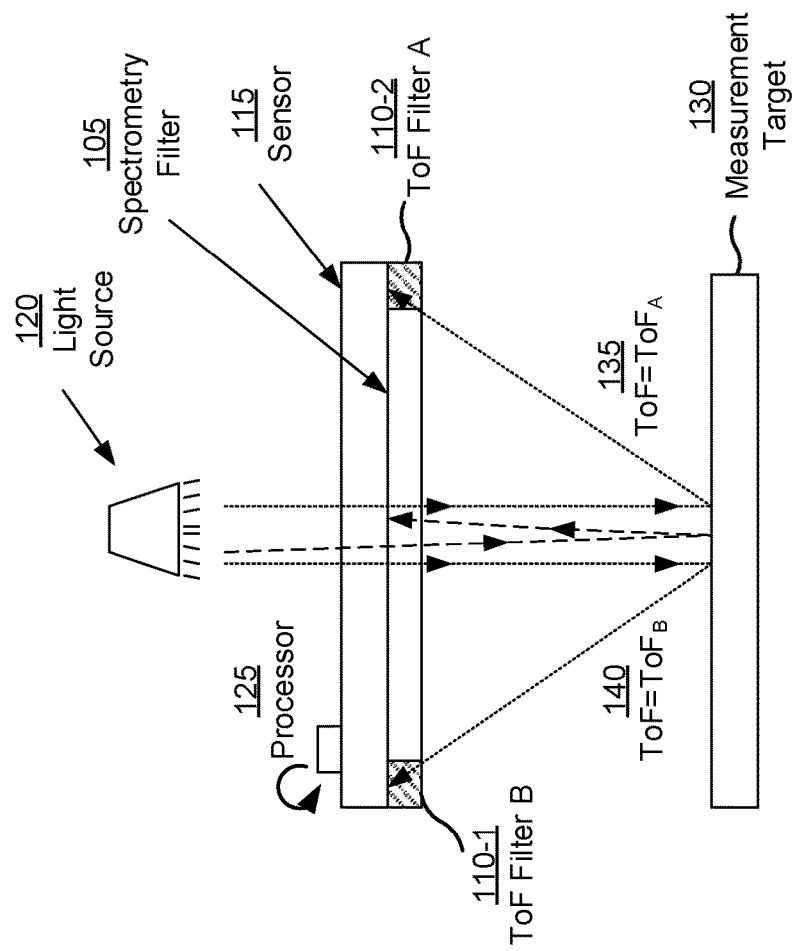
FIGS. 1A and 1B are diagrams of an overview of an example implementation described herein.

The following detailed description of example implementations refers to the accompanying drawings. The same reference numbers in different drawings may identify the same or similar elements. The following description uses a spectrometer as an example. However, the calibration principles, procedures, and methods described herein may be used with any sensor, including but not limited to other optical sensors and spectral sensors.

Multispectral imaging may be used to capture image data within specific wavelength ranges across the electromagnetic spectrum. In some cases, hyperspectral imaging may be performed, which may use more spectral bands and/or a tighter grouping of spectral bands than multispectral imaging. However, "multispectral" and "hyperspectral" are used interchangeably for the purposes of the implementations described herein. A sensor device may determine a measurement using multispectral imaging data based on a spectrometry analysis technique. Such a measurement may be referred to herein as a spectrometry measurement. Spectrometry measurements may be useful for various purposes, such as chemical composition analysis for a material, moisture content determination, vegetation coverage determination, plant health, plant nutrition, human health assessment, and/or the like.

It may be challenging to ensure that a sensor device is properly positioned for a spectrometry measurement. For example, a spectrometry measurement may be calibrated based on a particular spacing of a sensor device from a measurement target, or a spectrometry measurement may require a stationary sensor device. Some sensor devices may use mechanical fixturing to enforce the positioning required for a measurement, such as a hood, a light pipe, a collar, a spacer, and/or the like. However, mechanical fixturing may be large, costly, and/or cumbersome, and may be infeasible for certain types of sensor devices, such as mobile devices (e.g., smartphones).

Some implementations described herein provide a time-of-flight (ToF) based technique for determining that a spectrometry measurement is to be performed in accordance with a condition relating to an orientation or position of a sensor device. For example, a sensor device may perform a ToF measurement to determine that the sensor device is properly positioned for a spectrometry measurement to be performed by the sensor device. The sensor device may determine that the sensor device is positioned a proper distance from a measurement target (e.g., using a single ToF measurement or multiple ToF measurements), or may determine that the sensor device is properly aligned with the measurement target (e.g., using multiple ToF measurements to determine a plane of the sensor device and/or the measurement target). The ToF measurement may be performed based on light filtered by a ToF filter, which may be a region of a spectral filter for the spectrometry measurement that is designed to pass light associated with the ToF measurement. In some implementations, the spectrometry measurement may be performed on a next available read after the ToF measurement. In this way, the sensor device may perform a spectrometry measurement in accordance with a condition relating to an orientation or position of the sensor device based on a ToF measurement. This may improve accuracy of the spectrometry measurement and may reduce the impact of inconsistency in positioning the sensor device. Furthermore, performing the spectrometry measurement may reduce or eliminate reliance on mechanical fixturing to properly position the sensor device, thereby reducing size, cost, and weight of the sensor device.

Figure 1B:
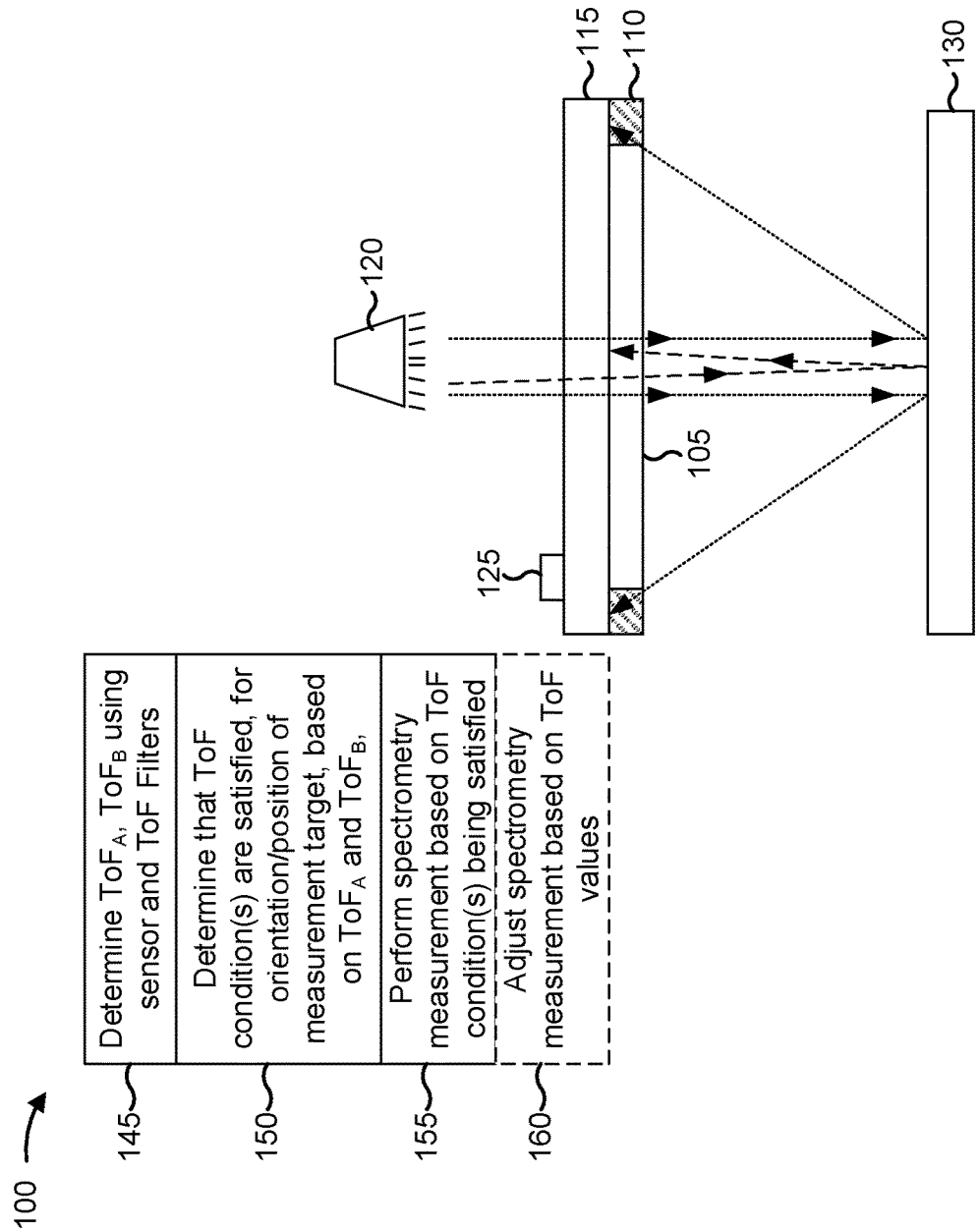

FIGS. 1A and 1B are diagrams of an overview of an example implementation 100 described herein. Example implementation 100 relates to determination of a spectrometry measurement based on a ToF measurement of a sensor device. As shown, the sensor device may include a spectrometry filter 105, one or more ToF filters 110-1 and 110-2 (shown as ToF Filter A and ToF Filter B), a sensor 115, a light source 120, and a processor 125. The sensor device, and the operation of the sensor device, are described in connection with FIG. 1A. The determination of a spectrometry measurement based on a ToF measurement of the sensor device is described in connection with FIG. 1B.

Spectrometry filter 105 may include a spectral filter, a multispectral filter, a multichannel spectral filter, a bandpass filter, a blocking filter, a long-wave pass filter, a short-wave pass filter, a dichroic filter, a linear variable filter (LVF), a circular variable filter (CVF), a Fabry-Perot filter, a Bayer filter, and/or the like. Spectrometry filter 105 may pass one or more wavelengths of light for performance of a spectrometry measurement on a measurement target 130. For example, the light passed by spectrometry filter 105 may be in the sub-visible wavelength range (e.g., ultraviolet and/or the like), the visible wavelength range (e.g., red, green, blue, and/or the like), the super-visible wavelength range (e.g., infrared, near-infrared, mid-infrared, and/or the like), or a different spectral range. In some implementations, spectrometry filter 105 may include a plurality of filters.

ToF filter 110 may include a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter, a Bayer filter, and/or the like. ToF filter 110 may pass one or more wavelengths of light for performance of a ToF measurement on the measurement target 130. For example, the light passed by ToF filter 110 may be in the near-infrared range or in another range (e.g., a wavelength range described herein or a wavelength range not described herein).

In example implementation 100, there are two ToF filters 110. In some implementations, there may be any number of ToF filters 110. A single ToF filter 110 may enable the measurement of a distance between the sensor device and the measurement target 130, whereas multiple ToF filters 110 may enable the determination of an orientation of the sensor device relative to the measurement target 130, as described in more detail in connection with FIG. 1B. In some implementations, ToF filter 110 may be part of spectrometry filter 105. For example, spectrometry filter 105 and ToF filter 110 may be a single filter or a single set of filters designed to pass wavelengths for ToF measurements and for spectrometry measurements. In some implementations, spectrometry filter 105 and ToF filter 110 may be coplanar. In some implementations, spectrometry filter 105 and ToF filter 110 may be in different planes.

Sensor 115 includes a device capable of performing a measurement of light directed toward sensor 115 (e.g., via spectrometry filter 105 and/or ToF filter 110), such as an optical sensor, a spectral sensor, an image sensor, and/or the like. For example, sensor 115 may perform a sensor measurement of light directed toward sensor 115. Sensor 115 may utilize one or more sensor technologies, such as a complementary metal-oxide-semiconductor (CMOS) technology, a charge-coupled device (CCD) technology, and/or the like. Sensor 115 may include multiple sensor elements (e.g., an array of sensor elements—referred to as a sensor array) each configured to obtain information. For example, a sensor element may provide an indication of intensity of light that is incident on the sensor element (e.g., active/inactive or a more granular indication of intensity). Using these indications, the sensor device may determine a ToF measurement and/or a spectrometry measurement, as described in more detail elsewhere herein. In some implementations, sensor 115 may include multiple, different sensors (e.g., one or more first sensors for a spectrometry measurement and one or more second sensors for a ToF measurement).

Light source 120 may provide light for a spectrometry measurement and/or a ToF measurement. For example, light source 120 may include a laser, a light-emitting diode, and/or the like. In some implementations, such as in example implementation 100, a single light source 120 may provide light for the spectrometry measurement and the ToF measurement(s). This may reduce cost, size, and complexity associated with providing multiple different light sources. In some implementations, respective separate light sources 120 may provide light for a spectrometry measurement and for a ToF measurement. This may enable more accurate or continuous determination of the spectrometry measurement while the light source 120 for the ToF measurement is chopped or pulsed for the ToF measurement. Here, sensor 115 and filters 105/110 are shown between measurement target 130 and light source 120. However, in some implementations, sensor 115 and filters 105/110 may not be between measurement target 130 and light source 120.

Processor 125 may perform operations related to determination of a ToF measurement and/or a spectrometry measurement, as described in more detail in connection with FIG. 1B. As one example, and as shown by reference numbers 135 and 140, processor 125 may determine one or more ToF measurements (shown as $ToF_A$ and $ToF_B$) using ToF Filters A and B, respectively. Processor 125 may determine a ToF measurement using sensor 115 and based on light transmitted by light source 120. For example, processor 125 may identify a particular pattern or intensity of the light transmitted by light source 120 using a region of sensor 115 that is associated with ToF filter 110. Processor 125 may determine a ToF for the light based on a transmission time of the light and a time at which the particular pattern or intensity is detected. For example, processor 125 may determine $ToF_A$ based on a time at which light is received via ToF Filter A after being transmitted by light source 120, and may determine $ToF_B$ based on a time at which light is received by ToF Filter B after being transmitted by light source 120. In some implementations, $ToF_A$ and $ToF_B$ may be associated with different wavelengths. In some implementations, $ToF_A$ and $ToF_B$ may be associated with the same wavelengths.

As shown in FIG. 1B, and by reference number 145, processor 125 may determine $ToF_A$ and $ToF_B$ using sensor 115 and ToF Filters A and B. For example, processor 125 may determine $ToF_A$ and $ToF_B$ using a ToF technique based on light emitted by light source 120 and filtered by ToF Filters A and B. In some implementations, processor 125 may perform one or more samples of sensor 115 to determine $ToF_A$ and/or $ToF_B$. For example, processor 125 may periodically perform samples of sensor 115 in order to identify a signal associated with light for $ToF_A$ and/or $ToF_B$. In some implementations, processor 125 may perform samples of regions of sensor 115 corresponding to (e.g., overlapped with, coextensive with, covered by, and/or the like) ToF Filter 1 and/or ToF Filter B.

As shown by reference number 150, processor 125 may determine that one or more ToF conditions are satisfied based on $ToF_A$ and $ToF_B$. For example, processor 125 may determine that a condition for an orientation or position of the sensor device and/or sensor 115 relative to measurement target 130 is satisfied based on $ToF_A$ and/or $ToF_B$. In some implementations, processor 125 may determine that a condition for a position of sensor 115 relative to measurement target 130 is satisfied. For example, when a ToF value (e.g., $ToF_A$, $ToF_B$, and/or the like) is within a particular range indicating that sensor 115 is a particular distance (or within an acceptable range of the particular distance) from measurement target 130, then processor 125 may determine that the condition is satisfied. In some implementations, processor 125 may determine that a condition for an orientation of sensor 115, or the sensor device, relative to measurement target 130 is satisfied. For example, processor 125 may determine, based on two or more ToF measurements, that a condition for an orientation of the sensor device and/or sensor 115 is satisfied. For example, the condition may be satisfied when each ToF measurement, of the two or more ToF measurements, is within a threshold range of each other. This may indicate that the sensor device and/or sensor 115 is approximately parallel to measurement target 130.

As shown by reference number 155, processor 125 may perform a spectrometry measurement based on the one or more ToF conditions being satisfied. For example, processor 125 may perform a sample of sensor 115 and/or a region of sensor 115 associated with the spectrometry measurement to determine image data for the spectrometry measurement, and may analyze the image data to determine the spectrometry measurement. In some implementations, processor 125 may trigger the spectrometry measurement to be performed based on the one or more ToF conditions being satisfied. In some implementations, the spectrometry measurement may relate to a spectroscopic signature of measurement target 130, a chemical composition of measurement target 130, and/or the like. In some implementations, the sensor device may determine a characteristic of a person (e.g., a health characteristic, a heart rate, a blood oxygenation level, a blood sugar level, a liveness level, and/or the like), and/or the like based on the spectrometry measurement.

As shown by reference number 160, in some cases, processor 125 may adjust the spectrometry measurement based on one or more ToF measurements. For example, processor 125 may augment, modify, or change the spectrometry measurement based on the one or more ToF measurements. As a more particular example, processor 125 may determine that the one or more ToF measurements indicate an orientation offset from measurement target 130 (e.g., an angular offset and/or the like) and may apply a transform to a spectrometry measurement to improve accuracy in view of the orientation offset. As another example, processor 125 may determine a speed or velocity of the sensor device or sensor 115, and may adjust the spectrometry measurement based on the speed or velocity. Additionally, or alternatively, processor 125 may provide the one or more ToF measurements and the spectrometry measurement. For example, processor 125 may provide the one or more ToF measurements and the spectrometry measurement for display, for processing by another device, and/or the like.

In some implementations, processor 125 may determine a ToF measurement after a spectrometry measurement. For example, processor 125 may perform a spectrometry measurement then a ToF measurement. This may be useful to determine the validity of the spectrometry measurement. For example, the ToF measurement may provide an indication of whether the sensor 115 was removed from ideal conditions for the spectrometry measurement too quickly. In some implementations, processor 125 may determine multiple ToF measurements before and after a spectrometry measurement to determine the velocity of the image sensor device before and after the spectral scan. This may be useful for determining the accuracy of the spectrometry measurement or for adjusting the spectrometry measurement based on the velocity.

As indicated above, FIGS. 1A and 1B are provided as one or more examples. Other examples may differ from what is described with regard to FIGS. 1A and 1B.

Figure 2:
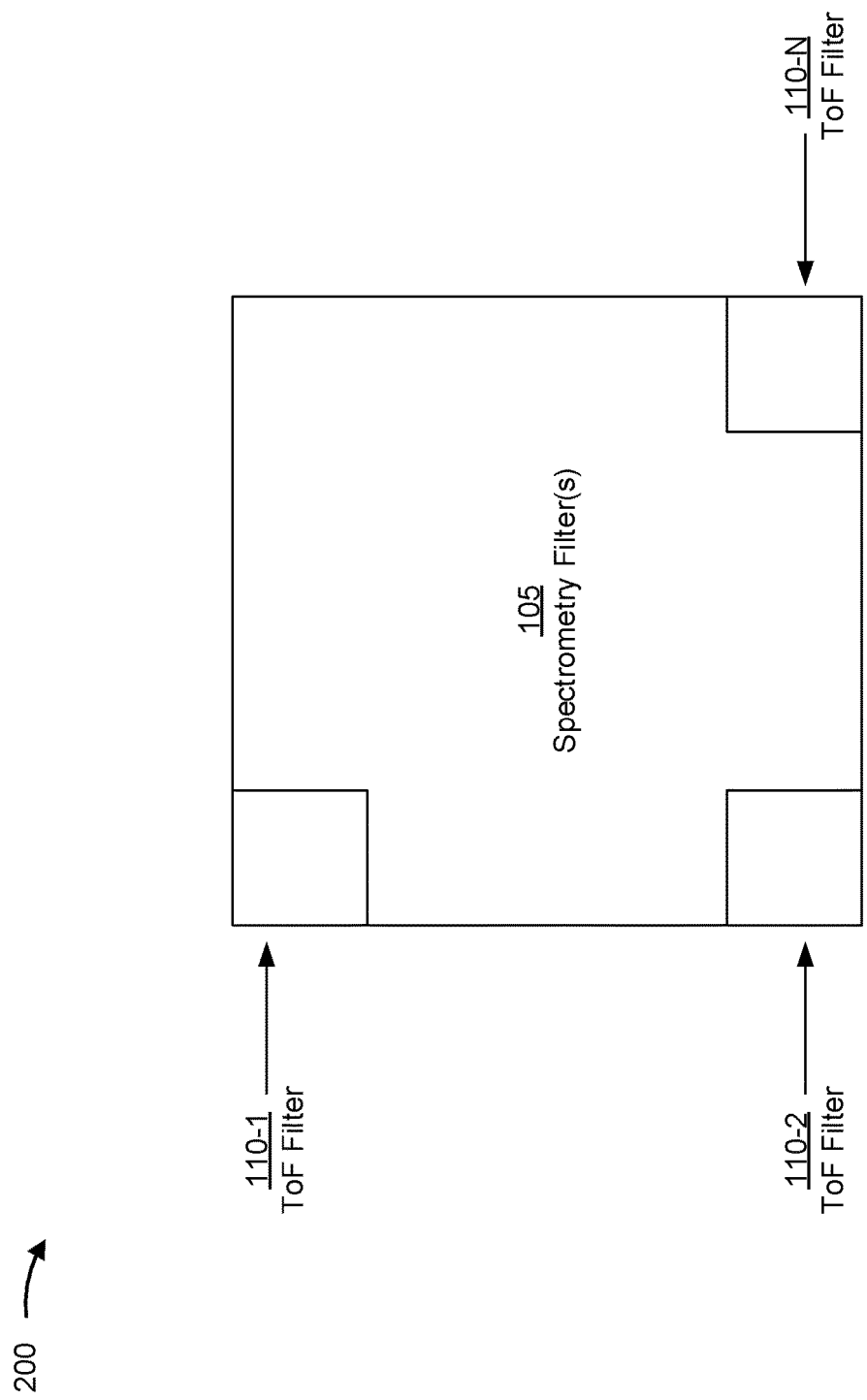
FIG. 2 is a diagram of an example of a spectral filter described herein.

FIG. 2 is a diagram of an example of a spectral filter 200 described herein. In FIG. 2, spectral filter 200 is shown in a head-on fashion, as opposed to the side views shown in FIGS. 1A and 1B. As shown, spectral filter 200 may include one or more spectrometry filters 105 (described in more detail in connection with FIGS. 1A and 1B) and one or more ToF filters 110-1 through 110-N (also described in more detail in connection with FIGS. 1A and 1B). In some implementations, spectral filter 200 may include a single ToF filter 110. This may enable the measurement of a distance of the sensor device from a measurement target (e.g., measurement target 130) using the single ToF filter

110. In some implementations, spectral filter 200 may include two ToF filters 110 (e.g., that are spatially distributed). This may enable measurement of an orientation of the sensor device relative to the measurement target about an axis (e.g., the axis that is coplanar with and orthogonal to an axis that connects the two ToF filters 110). In some implementations, spectral filter 200 may include three or more ToF filters 110 that are spatially distributed, as shown in FIG. 2. This may enable measurement of an orientation of the sensor device relative to the measurement target about two axes (e.g., the two axes in the plane of the spectral filter 200), as long as the three or more ToF filters 110 are not all placed on a common axis.

Thus, position and/or orientation information may be determined using one or more ToF filters 110 based on locations of the one or more ToF filters 110. For example, the one or more ToF filters 110 may be spatially distributed to allow determination of the orientation based on light passed via the one or more ToF filters 110. As explained above, this enables more accurate determination of spectrometry measurements without a corresponding increase in size, weight, or complexity of the sensor device.

As indicated above, FIG. 2 is provided merely as an example. Other examples may differ from what is described with regard to FIG. 2.

Figure 3:
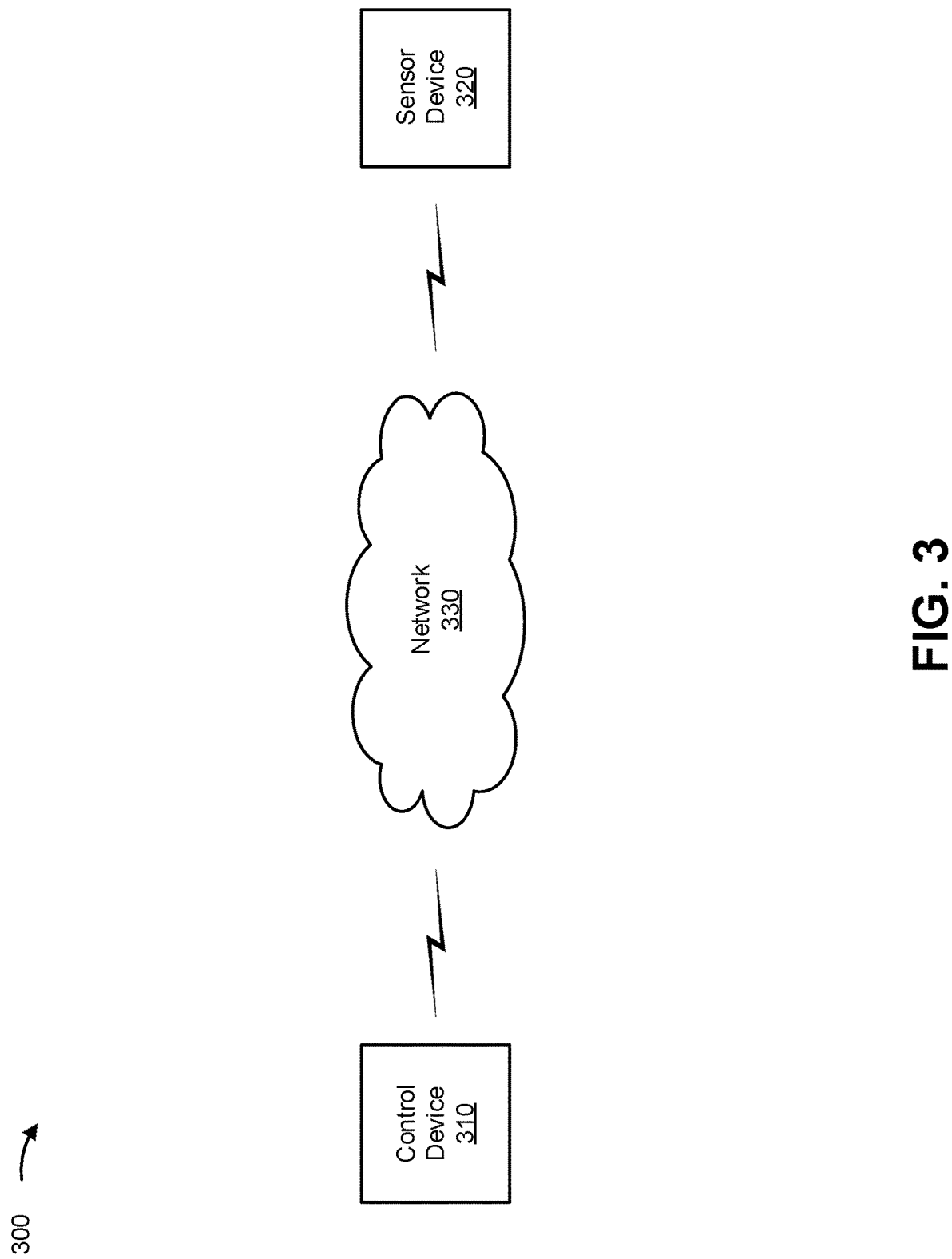
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a control device 310, a sensor device 320, and a network 330. Devices of environment 300 may interconnect via wired connections, wireless connections, or a combination of wired and wireless connections.

Control device 310 includes one or more devices capable of storing, processing, and/or routing information associated with multispectral sensing. For example, control device 310 may include a server, a computer, a wearable device, a cloud computing device, and/or the like. In some implementations, control device 310 may be associated with a particular sensor device 320. In some implementations, control device 310 may be associated with multiple sensor devices 320. In some implementations, control device 310 may receive information from and/or transmit information to another device in environment 300, such as sensor device 320.

Sensor device 320 includes a device capable of performing a measurement of light directed toward sensor device 320. For example, sensor device 320 may include an image sensor, a multispectral sensor, a spectral sensor, and/or the like that may perform a sensor measurement of light directed toward sensor device 320. Sensor device 320 may utilize one or more sensor technologies, such as a complementary metal-oxide-semiconductor (CMOS) technology, a charge-coupled device (CCD) technology, and/or the like. Sensor device 320 may be capable of performing a ToF measurement (e.g., using a region of a sensor of sensor device 320, based on light passed via a particular filter or filter region of sensor device 320, and/or the like).

Network 330 includes one or more wired and/or wireless networks. For example, network 330 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
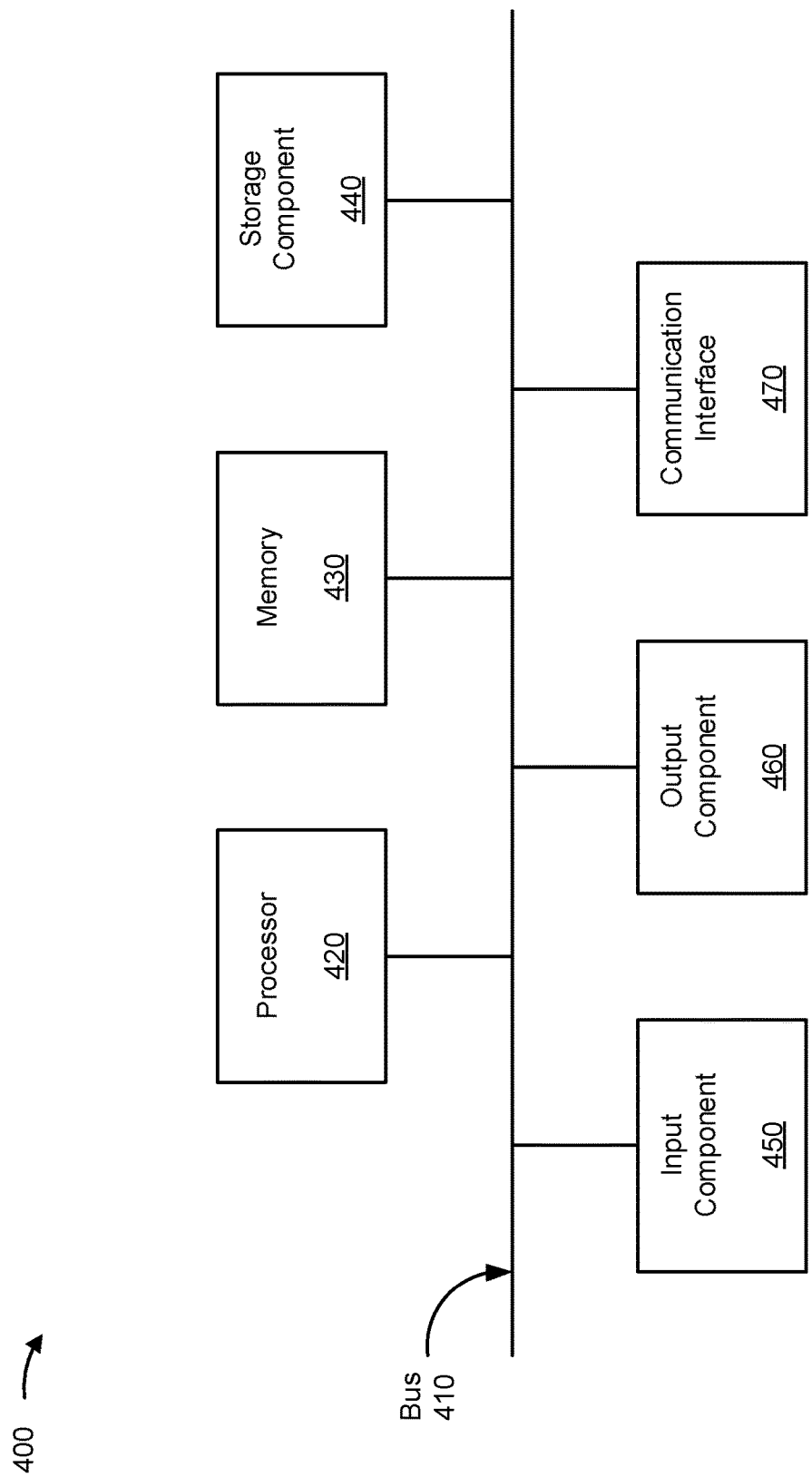
FIG. 4 is a diagram of example components of one or more devices of FIG. 2.

FIG. 4 is a diagram of example components of a device 400. Device 400 may correspond to control device 310 and/or sensor device 320. In some implementations, control device 310 and/or sensor device 320 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes one or more memories, such as a random access memory (RAM), a read only memory (ROM), and/or another type of dynamic or static storage device (e.g., a flash memory, a magnetic memory, and/or an optical memory) that stores information and/or instructions for use by processor 420. An example of processor 420 is processor 125, shown and described in connection with FIGS. 1A and 1B.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
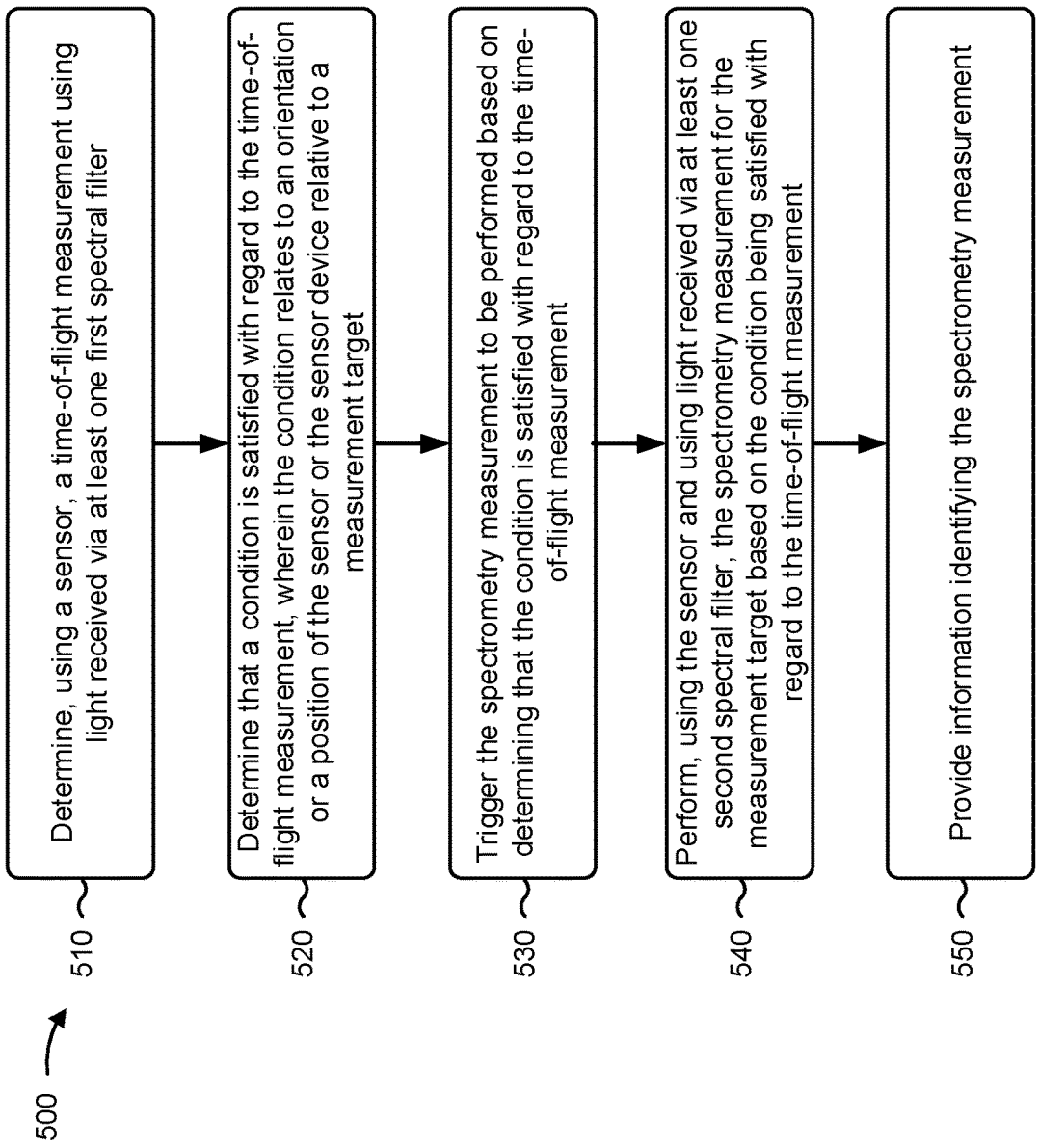
FIG. 5 is a flow chart of an example process for performing a spectrometry measurement based on a time-of-flight measurement.

FIG. 5 is a flow chart of an example process 500 for performing a spectrometry measurement based on a time-of-flight measurement. In some implementations, one or more process blocks of FIG. 5 may be performed by a sensor device (e.g., the sensor device of FIG. 1, sensor device 320, and/or the like). In some implementations, one or more process blocks of FIG. 5 may be performed by another device or a group of devices separate from or including the sensor device, such as a control device (e.g., control device 310).

As shown in FIG. 5, process 500 may include determining, using a sensor, a time-of-flight measurement based on light received via at least one first spectral filter (block 510). For example, the sensor device (e.g., using processor 125, processor 420, sensor 115, and/or the like) may determine a time-of-flight measurement based on light received via at least one first spectral filter. In some implementations, the at least one first spectral filter may be a ToF filter (e.g., ToF filter 110), as described in more detail elsewhere herein. In some implementations, the sensor device may include at least one second spectral filter. In some implementations, the at least one first spectral filter is associated with a spectral range for a time-of-flight measurement, and the at least one second spectral filter is associated with a spectral range for a spectrometry measurement.

As further shown in FIG. 5, process 500 may include determining that a condition is satisfied with regard to the time-of-flight measurement, wherein the condition relates to an orientation or a position of the sensor or the sensor device relative to a measurement target (block 520). For example, the sensor device (e.g., using processor 125 or processor 420) may determine that a condition is satisfied with regard to the ToF measurement. The condition may relate to an orientation or a position of the sensor or the sensor device relative to a measurement target.

As further shown in FIG. 5, process 500 may include triggering the spectrometry measurement to be performed based on determining that the condition is satisfied with regard to the time-of-flight measurement (block 530). For example, the sensor device (e.g., using processor 125 or processor 420) may trigger the spectrometry measurement to be performed. The sensor device may trigger the spectrometry measurement to be performed based on determining that the condition is satisfied with regard to the ToF measurement.

As further shown in FIG. 5, process 500 may include performing, using the sensor and based on light received via at least one second spectral filter, the spectrometry measurement for the measurement target based on the condition being satisfied with regard to the time-of-flight measurement (block 540). For example, the sensor device (e.g., using processor 125, processor 420, sensor 115, and/or the like) may perform a spectrometry measurement based on light received via at least one second spectral filter. The sensor device may perform the spectrometry measurement using the sensor. The sensor device may perform the spectrometry measurement based on the condition being satisfied with regard to the ToF measurement.

As further shown in FIG. 5, process 500 may include providing information identifying the spectrometry measurement (block 550). For example, the sensor device (e.g., using processor 125, processor 420, output component 460, and/or the like) may provide information identifying the spectrometry measurement. In some implementations, the sensor device may store information identifying the spectrometry measurement. In some implementations, the sensor device may provide the information identifying the spectrometry measurement for a user (e.g., via a user interface or a display associated with the sensor device).

Process 500 may include additional implementations, such as any single implementation or any combination of implementation described below and/or in connection with one or more other processes described elsewhere herein.

In a first implementation, the at least one first spectral filter comprises a plurality of first spectral filters in a plane with the at least one second spectral filter. In a second implementation, alone or in combination with the first implementation, the at least one first spectral filter comprises a plurality of first spectral filters that are spatially distributed to allow determination of the orientation based on light passed via the plurality of first spectral filters. In a third implementation, alone or in combination with one or more of the first and second implementations, the time-of-flight measurement is a first time-of-flight measurement, and the sensor device is further to determine a second time-of-flight measurement after the spectrometry measurement and determine a velocity or an updated orientation or position of the sensor device based on the second time-of-flight measurement. In a fourth implementation, alone or in combination with one or more of the first through third implementations, the at least one first spectral filter comprises a single spectral filter, and the orientation or the position is determined based on light passed via the single spectral filter.

In a fifth implementation, alone or in combination with one or more of the first through fourth implementations, the sensor device may modify the spectrometry measurement based on the time-of-flight measurement. In a sixth implementation, alone or in combination with one or more of the first through fifth implementations, the sensor device may obtain a first sample of data from the sensor; and obtain a second sample of data from the sensor based on the spectrometry measurement being triggered. In a seventh implementation, alone or in combination with one or more of the first through sixth implementations, the first sample is separated from the second sample by less than approximately ten milliseconds. In an eighth implementation, alone or in combination with one or more of the first through seventh implementations, the first sample is associated with one or more first pixel regions of the sensor and the second sample is of associated with or more second pixel regions of the sensor.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
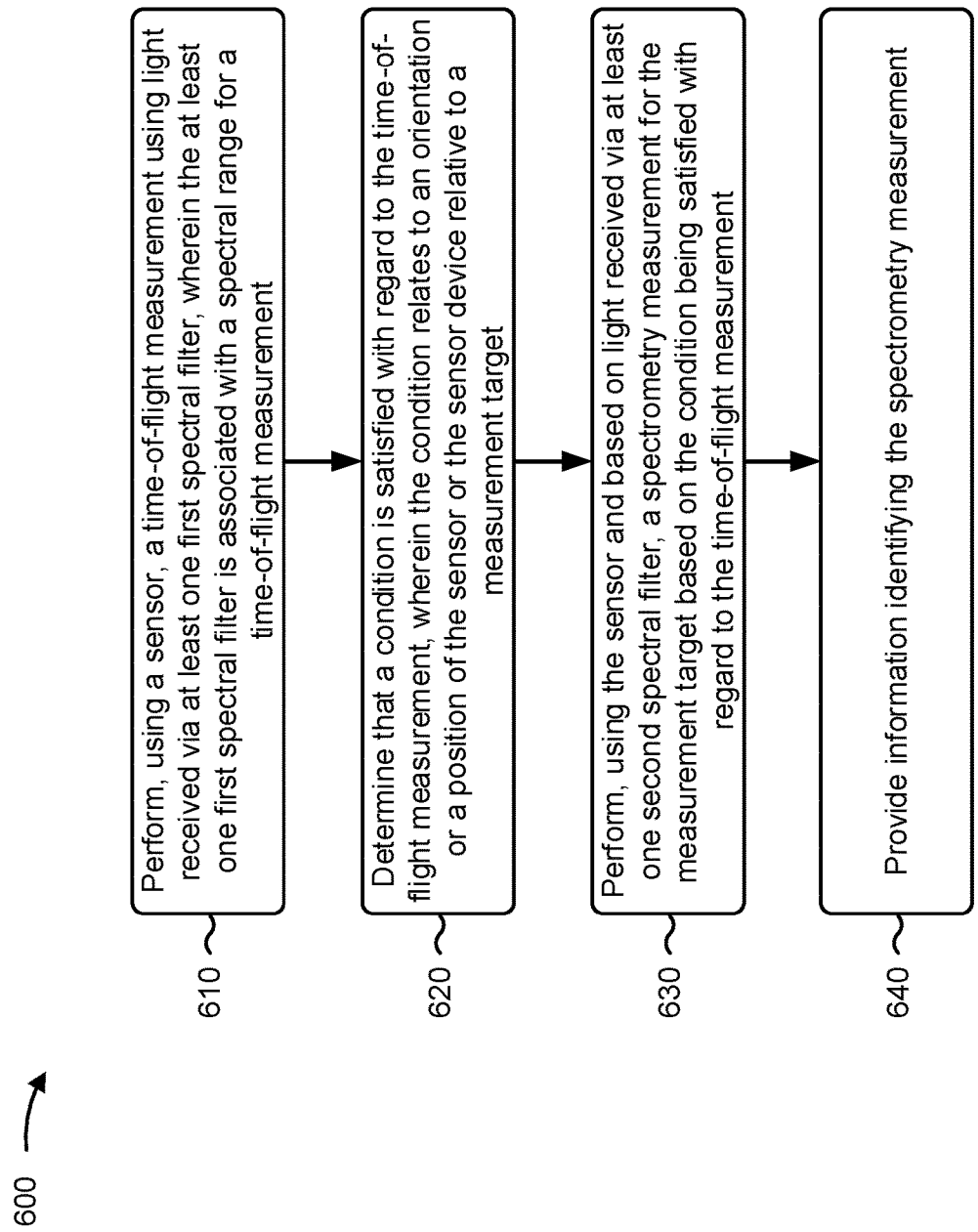
FIG. 6 is a flow chart of an example process for performing a spectrometry measurement based on a time-of-flight measurement.

FIG. 6 is a flow chart of an example process 600 for performing a spectrometry measurement based on a time-of-flight measurement. In some implementations, one or more process blocks of FIG. 6 may be performed by a sensor device (e.g., the sensor device of FIG. 1, sensor device 320, and/or the like). In some implementations, one or more process blocks of FIG. 6 may be performed by another device or a group of devices separate from or including the sensor device, such as a control device (e.g., control device 310).

As shown in FIG. 6, process 600 may include performing, using a sensor, a time-of-flight measurement based on light received via at least one first spectral filter, wherein the at least one first spectral filter is associated with a spectral range for a time-of-flight measurement (block 610). For example, the sensor device (e.g., using processor 125, processor 420, sensor 115, and/or the like) may perform a time-of-flight measurement based on light received via at least one first spectral filter. In some implementations, the at least one first spectral filter may be a ToF filter (e.g., ToF filter 110), as described in more detail elsewhere herein. In some implementations, the sensor device may include at least one second spectral filter. In some implementations, the at least one first spectral filter is associated with a spectral range for a time-of-flight measurement, and the at least one second spectral filter is associated with a spectral range for a spectrometry measurement.

As further shown in FIG. 6, process 600 may include determining that a condition is satisfied with regard to the time-of-flight measurement, wherein the condition relates to an orientation or a position of the sensor or the sensor device relative to a measurement target (block 620). For example, the sensor device (e.g., using processor 125 or processor 420) may determine that a condition is satisfied with regard to the ToF measurement. The condition may relate to an orientation or a position of the sensor or the sensor device relative to a measurement target.

As further shown in FIG. 6, process 600 may include performing, using the sensor and based on light received via at least one second spectral filter, a spectrometry measurement for the measurement target based on the condition being satisfied with regard to the time-of-flight measurement (block 630). For example, the sensor device (e.g., using processor 125, processor 420, sensor 115, and/or the like) may perform a spectrometry measurement based on light received via at least one second spectral filter. The sensor device may perform the spectrometry measurement using the sensor. The sensor device may perform the spectrometry measurement based on the condition being satisfied with regard to the ToF measurement.

As further shown in FIG. 6, process 600 may include providing information identifying the spectrometry measurement (block 640). For example, the sensor device (e.g., using processor 125, processor 420, output component 460, and/or the like) may provide information identifying the spectrometry measurement. In some implementations, the sensor device may store information identifying the spectrometry measurement. In some implementations, the sensor device may provide the information identifying the spectrometry measurement to a user (e.g., via a user interface or a display associated with the sensor device).

Process 600 may include additional implementations, such as any single implementation or any combination of implementation described below and/or in connection with one or more other processes described elsewhere herein.

In a first implementation, the light received via the at least one first spectral filter and the light received via the at least one second spectral filter are from a same light source. In a second implementation, alone or in combination with the first implementation, the light received via the at least one first spectral filter and the light received via the at least one second spectral filter are from different light sources. In a third implementation, alone or in combination with one or more of the first and second implementations, the at least one first spectral filter comprises a plurality of first spectral filters in a plane with the at least one second spectral filter. In a fourth implementation, alone or in combination with one or more of the first through third implementations, the at least one first spectral filter comprises a plurality of first spectral filters that are spatially distributed to allow determination of the orientation based on light passed via the plurality of first spectral filters. In a fifth implementation, alone or in combination with one or more of the first through fourth implementations, the condition relates to whether the sensor is parallel to a surface of the measurement target. In a sixth implementation, alone or in combination with one or more of the first through fifth implementations, the at least one first spectral filter comprises a plurality of spectral filters. The sensor device may perform the time-of-flight measurement for a plurality of wavelengths corresponding to the plurality of spectral filters. In a seventh implementation, alone or in combination with one or more of the first through sixth implementations, the condition relates to a threshold distance between the sensor device and the measurement target.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for performing a spectrometry measurement based on a time-of-flight measurement. In some implementations, one or more process blocks of FIG. 7 may be performed by a sensor device (e.g., the sensor device of FIG. 1, sensor device 320, and/or the like). In some implementations, one or more process blocks of FIG. 7 may be performed by another device or a group of devices separate from or including the sensor device, such as a control device (e.g., control device 310).

As shown in FIG. 7, process 700 may include determining a time-of-flight measurement by performing a sample of a sensor based on light received via at least one first spectral filter, wherein the at least one first spectral filter is associated with a spectral range for a time-of-flight measurement (block 710). For example, the sensor device (e.g., using processor 125, processor 420, sensor 115, and/or the like) may perform a sample of a sensor and determine a time-of-flight measurement based on light received via at least one first spectral filter. In some implementations, the at least one first spectral filter may be a ToF filter (e.g., ToF filter 110), as described in more detail elsewhere herein. In some implementations, the sensor device may include at least one second spectral filter. In some implementations, the at least one first spectral filter is associated with a spectral range for a time-of-flight measurement, and the at least one second spectral filter is associated with a spectral range for a spectrometry measurement.

As further shown in FIG. 7, process 700 may include determining that a condition is satisfied with regard to the time-of-flight measurement, wherein the condition relates to an orientation or a position of the sensor or the sensor device relative to a measurement target (block 720). For example, the sensor device (e.g., using processor 125 or processor 420) may determine that a condition is satisfied with regard to the ToF measurement. The condition may relate to an orientation or a position of the sensor or the sensor device relative to a measurement target.

As further shown in FIG. 7, process 700 may include triggering a spectrometry measurement to be performed based on determining that the condition is satisfied with regard to the time-of-flight measurement (block 730). For example, the sensor device (e.g., using processor 125 or processor 420) may trigger the spectrometry measurement to be performed. The sensor device may trigger the spectrometry measurement to be performed based on determining that the condition is satisfied with regard to the ToF measurement.

As further shown in FIG. 7, process 700 may include performing, based on light received via at least one second spectral filter and by performing a sample of the sensor, the spectrometry measurement for the measurement target based on the condition being satisfied with regard to the time-of-flight measurement (block 740). For example, the sensor device (e.g., using processor 125, processor 420, sensor 115, and/or the like) may perform a sample of the sensor and may perform a spectrometry measurement based on light received via at least one second spectral filter. The sensor device may perform the spectrometry measurement using the sensor. The sensor device may perform the spectrometry measurement based on the condition being satisfied with regard to the ToF measurement.

Process 700 may include additional implementations, such as any single implementation or any combination of implementation described below and/or in connection with one or more other processes described elsewhere herein.

In a first implementation, the sensor device may determine pixel values in at least one region of the sensor corresponding to the at least one first spectral filter; determine that the pixel values match a pattern associated with the time-of-flight measurement; and determine the time-of-flight measurement based on the pixel values. In a second implementation, alone or in combination with the first implementation, the spectrometry measurement is based on a near-infrared (NIR) wavelength range.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, and/or the like), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sensor device, comprising:
   a spectrometry filter configured to pass one or more first wavelengths of light for performance of a spectrometry measurement on a measurement target, wherein the spectrometry filter is a multichannel spectral filter; and
   one or more time-of-flight (ToF) filters configured to:
      pass one or more second wavelengths of light for performance of a ToF measurement on the measurement target, and
      one or more of:
         enable a measurement of a distance between the sensor device and the measurement target, or
         enable a measurement of an orientation of the sensor device relative to the measurement target.

2. The sensor device of claim 1, wherein at least one of the one or more first wavelengths of light or the one or more second wavelengths of light are in a near-infrared range.

3. The sensor device of claim 1, wherein the one or more ToF filters include a single ToF filter configured to enable the measurement of the distance between the sensor device and the measurement target.

4. The sensor device of claim 1, wherein the one or more ToF filters include multiple ToF filters configured to enable the measurement of the orientation of the sensor device relative to the measurement target.

5. The sensor device of claim 1, wherein the spectrometry filter and the one or more ToF filters are coplanar.

6. The sensor device of claim 1, further comprising:
one or more first sensors configured to determine the spectrometry measurement; and
one or more second sensor configured to determine the ToF measurement.

7. The sensor device of claim 1, further comprising:
one or more light sources configured to provide light for one or more of the spectrometry measurement or the ToF measurement.

8. The sensor device of claim 7, wherein the spectrometry filter and the one or more ToF filters are between the one or more light sources and the measurement target.

9. The sensor device of claim 1, wherein the one or more ToF filters include:
a first ToF filter,
a second ToF filter that connects to the first ToF filter via a first axis, and
a third ToF filter that connects to the second ToF filter via a second axis that is orthogonal to the first axis.

10. The sensor device of claim 1, further comprising:
a sensor configured to determine one or more of the spectrometry measurement or the ToF measurement, wherein the sensor is between one or more light sources and the measurement target.

11. A device, comprising:
a spectrometry filter configured to pass one or more first wavelengths of light; and
a plurality of time-of-flight (ToF) filters configured to pass one or more second wavelengths of light,
wherein the plurality of ToF filters include:
a first ToF filter,
a second ToF filter that connects to the first ToF filter via a first axis, and
a third ToF filter that connects to the second ToF filter via a second axis that is orthogonal to the first axis.

12. The device of claim 11, wherein the spectrometry filter is a multichannel spectral filter.

13. The device of claim 11, wherein at least one of the one or more first wavelengths of light or the one or more second wavelengths of light is in a near-infrared range.

14. The device of claim 11, further comprising:
a sensor configured to determine one or more of a spectrometry measurement or a ToF measurement based on one or more of the one or more first wavelengths of light or the one or more second wavelengths of light.

15. The device of claim 11, wherein the plurality of ToF filters are configured to enable a measurement of an orientation of the device relative to a measurement target.

16. A device, comprising:
a spectrometry filter configured to pass one or more first wavelengths of light for performance of a spectrometry measurement on a measurement target; and
one or more time-of-flight (ToF) filters configured to pass one or more second wavelengths of light for performance of a ToF measurement on the measurement target,
wherein the spectrometry filter and the one or more ToF filters are between one or more light sources and the measurement target.

17. The device of claim 16, further comprising one or more of:
one or more first sensors configured to determine the spectrometry measurement; or
one or more second sensors configured to determine the ToF measurement.

18. The device of claim 16, further comprising:
the one or more light sources,
wherein the one or more light sources are configured to provide light for one or more of the spectrometry measurement or the ToF measurement.

19. The device of claim 16, wherein at least one of the one or more first wavelengths of light or the one or more second wavelengths of light are in a near-infrared range.

20. The device of claim 16, wherein the spectrometry filter and the one or more ToF filters are coplanar.

* * * * *